United States Patent
Sjölund et al.

(10) Patent No.: US 6,830,008 B2
(45) Date of Patent: Dec. 14, 2004

(54) OPTIMIZATION OF MILKING

(75) Inventors: Martin Sjölund, Stockholm (SE); Hans Hansson, Södertälje (SE)

(73) Assignee: Delaval Holding AB, Tumba (SE)

( * ) Notice: Subject to any disclaimer, the term of this patent is extended or adjusted under 35 U.S.C. 154(b) by 0 days.

(21) Appl. No.: 10/451,252

(22) PCT Filed: Dec. 21, 2001

(86) PCT No.: PCT/SE01/02886

§ 371 (c)(1),
(2), (4) Date: Jun. 20, 2003

(87) PCT Pub. No.: WO02/054857

PCT Pub. Date: Jul. 18, 2002

(65) Prior Publication Data

US 2004/0025792 A1 Feb. 12, 2004

(30) Foreign Application Priority Data

Jan. 12, 2001 (SE) .............................................. 0100095

(51) Int. Cl.⁷ .............................................. A01J 5/007
(52) U.S. Cl. ................................. 119/14.08; 119/14.01; 119/14.02
(58) Field of Search .......................... 119/14.08, 14.02, 119/14.03, 14.01

(56) References Cited

U.S. PATENT DOCUMENTS

| | | | | |
|---|---|---|---|---|
| 3,773,016 A | * | 11/1973 | Needham et al. | 119/14.08 |
| 4,011,838 A | * | 3/1977 | Nordegren et al. | 119/14.08 |
| 4,064,838 A | * | 12/1977 | Mukarovsky et al. | 119/14.08 |
| 4,292,926 A | * | 10/1981 | Tilman | 119/14.02 |
| 4,391,221 A | * | 7/1983 | Hoefelmayr et al. | 119/14.08 |
| 4,574,736 A | * | 3/1986 | Tanaka et al. | 119/14.08 |
| 4,771,007 A | * | 9/1988 | Tippetts et al. | 436/150 |
| 5,090,359 A | * | 2/1992 | Pettersson et al. | 119/14.08 |
| 5,881,669 A | * | 3/1999 | van den Berg et al. | 119/14.03 |
| 6,167,838 B1 | * | 1/2001 | van den Berg | 119/14.02 |
| 6,257,169 B1 | * | 7/2001 | Oosterling | 119/14.02 |
| 6,463,877 B1 | * | 10/2002 | van der Lely | 119/14.08 |

FOREIGN PATENT DOCUMENTS

| | | |
|---|---|---|
| EP | 0 385 539 | 9/1990 |
| EP | 0 677 243 | 10/1995 |
| WO | WO 99/03330 | 1/1999 |
| WO | WO 00/11933 | 3/2000 |

* cited by examiner

Primary Examiner—Michael J. Carone
Assistant Examiner—Bret Hayes
(74) Attorney, Agent, or Firm—Harness, Dickey & Pierce, PLC

(57) ABSTRACT

A more effective method of automatically milking animals in an automatic milking facility is disclosed. The method includes (i) assigning a respective threshold value (t.v.) to each of the udder quarters ($1^{st}$ u.q.; $2^{nd}$ u.q.; $3^{rd}$ u.q.; $4^{th}$ u.q.) of an animal to be milked indicating when the milking of the corresponding udder quarter is to be ended; (ii) measuring the milk flow from each udder quarter of animal during milking; and (iv) ending the milking of an udder quarter of the animal (end1; end2; end3; end4) in dependence on the measured milk flow from that udder quarter reaches the corresponding threshold value. The threshold value of the udder quarter ($4^{th}$ u.q.) of the animal, for which the ending of milking very last remains is raised (t.v.$_{-115\%}$; t..V.$_{inf}$; t.v.(t); t.v.$_{eo}$) subsequently to the very first ending of milking of an udder quarter of the animal, to thereby shorten the total milking time (tmt) of the animal, and thus more rapidly free milking capacity of the milking facility to be used for the milking of a further animal.

25 Claims, 2 Drawing Sheets

OPTIMIZATION OF MILKING

TECHNICAL FIELD OF THE INVENTION

The present invention generally relates to dairy farming and to milking of dairy animals therein.

Particularly, the invention relates to an improved method of automatically milking animals, to an automatic milking facility adapted to perform said method, and to a computer program product for controlling the milking performed by a computer-controlled milking facility in accordance with above said method when run on the computer of said computer-controlled milking facility.

DESCRIPTION OF RELATED ART AND BACKGROUND OF THE INVENTION

In modern dairy farm industry there are continuous research and development activities in order to improve the efficiency of various activities such as machine milking, which, inter alia, involves increased milk yield and reduced milking time.

A major trend in this respect is an increased degree of automation of the various activities. For instance, machine milking may be performed by milking robots in a completely automated manner. Such an automatic milking system may take care of milking, feeding, milk inspection, milk sampling, animal traffic, etc. in a large area wherein the dairy animals are walking about freely and are visiting the milking machine voluntarily.

An automatic milking machine involves heavy expenditure and has a limited milk production capacity. How to operate and use such a milking machine, which animals are visiting on a voluntary basis, in order to obtain an overall dairy farm performance is an arduous task. An objective in this respect is to achieve an optimal milk production. Naturally, ethical aspects as well as animal care have to be considered and not only the milk flow out from the machine.

WO 99/03330 (MAASLAND N.V.) discloses a method and implement for automatically milking animals, while aiming at yielding more milk. The implement is for this reason provided with adjusting means with the aid of which the milking duration, i.e. the period of time in which the animal is milked, is adjustable. In this manner it is possible to choose a favorable milking duration, in such a manner that this results in a higher milk production. The milking duration may be variably adjustable or may be adjustable per animal. Further, the milking rate may be measured per udder quarter and the cumulative quantity of milk produced may be deducted therefrom. When this quantity exceeds a specific value the milking is ended and the implement can be employed for the milking of another animal.

While such approach provides for an increased milk yield and an improved overall milking method, it is impaired by certain limitations. Firstly, such approach is static and does not take any time delay in the milking of an individual udder quarter into consideration. Further, the udder quarters of a cow, for instance, are separate and individual milk producing units and thus the use of one specific value for all udder quarters may not be optimal.

SUMMARY OF THE INVENTION

It is an object of the present invention to provide an improved method of automatically milking animals, such as cows, in an automatic milking facility provided with a milk flow measuring device capable of, during milking, in-situ measuring the individual milk flow from each udder quarter of the animal being milked, which method further optimizes the overall milk production.

It is yet a further object to provide such method, which is simple, reliable, of low cost, and easy to-implement.

It is still a further object to provide such method, which is very flexible and takes into account different milking start times for different udder quarters of a cow and different milk content in different udder quarters.

Further objects of the present invention are to provide an automatic milking facility and a computer program product for performing and controlling, respectively, the above said method.

These objects, among others, are according to the present invention, attained by methods, automatic milking facilities, and a computer program product as claimed in the appended claims.

By the provision of a flexible threshold value adjustment for the udder quarters(s), still being milked after the first udder quarter is finished (i.e. when the milk flow therefrom has reached the threshold value for that udder quarter) the threshold value(s) for this (theses) remaining udder quarter (s) can be raised in order to decrease the total milking time of the animal, while some amount of milk, which would conventionally be drawn, is left in the last finished udder quarter, or optionally udder quarters. However, as the milking capacity of the milking facility is now more rapidly freed to be used for the milking of another unmilked animal, the overall milk production by the milking facility can be increased.

The threshold value(s) for the last finished udder quarter (s) can be adjusted in a number of flexible manners of which the most important are to raise the threshold value(s) to a new fixed value as the consequence of that the milking of one, two, or three udder quarters is finished (i.e. that the milk flow therefrom has reached the threshold value(s) for this (these) udder quarter(s)), which fixed value can be a certain percentage, such as e.g. 115 or 300%, of the original threshold value(s). Optionally, the threshold value(s) is (are) raised to such high level such that the milking of the corresponding udder(s) is (are) ended instantaneously. In yet a version, the threshold value(s) is (are) time-dependent (i.e. increasing with time).

The threshold value(s) may be instantaneous milk flow values, milk flow values integrated over a short time period (time averaged milk flow), or over the complete milking to give an accumulated milk flow corresponding to the milk yield of the respective udder quarter.

Further characteristics of the invention and advantages thereof will be evident from the following detailed description of embodiments of the invention.

In the following detailed description the milk producing animals are cows. However, the invention is not limited to cows, but is applicable to any animals having the capability to produce large quantities of milk, such as sheep, goats, buffaloes, horses, etc.

BRIEF DESCRIPTION OF THE DRAWINGS

The present invention will become more fully understood from the detailed description of embodiments of the present invention given hereinbelow and the accompanying FIGS. 1a–d, which are given by way of illustration only, and thus are not limitative of the present invention.

DETAILED DESCRIPTION OF EMBODIMENTS

Figure 1A:
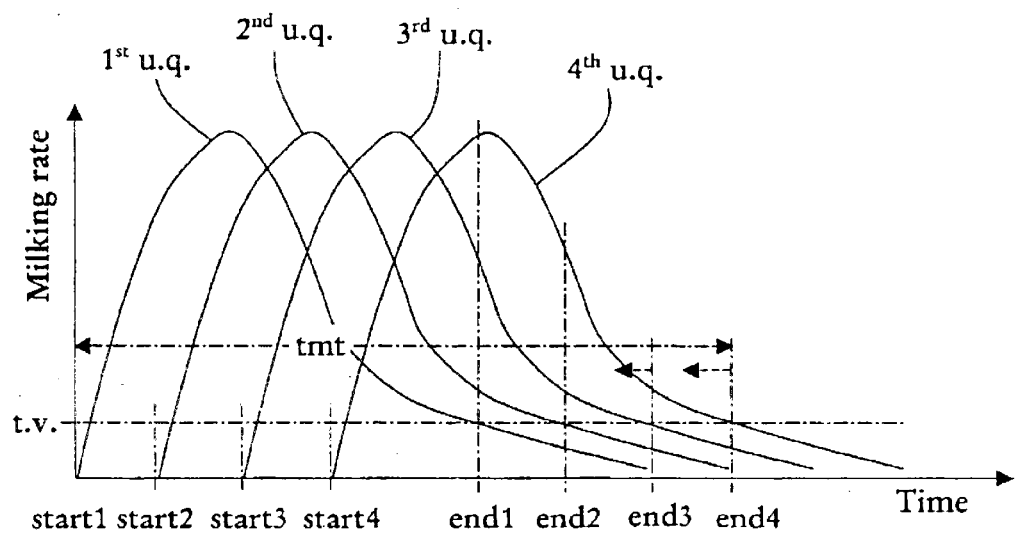
FIG. 1a displays schematically a diagram in which milking rate in quantity per unit time for each udder quarter is set out against time in a typical automatic milking cycle.

In the following description, for purposes of explanation and not limitation, specific details are set forth, such as particular techniques and applications in order to provide a thorough understanding of the present invention. However, it will be apparent to one skilled in the art that the present invention may be practised in other embodiments that depart from these specific details. In other instances, detailed descriptions of well-known techniques are omitted so as not to obscure the description of the present invention with unnecessary details.

The present invention is advantageously implemented in an automatic milking facility arranged for voluntary milking of freely walking cows, i.e. the cows enter the milking facility in order to be milked when they need to (or want to). The milking facility includes four teatcups, each being individually connectable to a source of vacuum, and each being connected to an end unit for collection of milk. Further, the milking facility is provided with a milk flow-measuring device capable of, during milking, in-situ measuring the individual milk flow from each teat of the cow being milked. Prior to milking the teatcups are typically applied to the teats of the cow by means of a handling device having a robot arm arranged to automatically apply the teatcups in some sequential order.

Furthermore, such milking facility comprises typically an identification system provided to identify a cow approaching the milking facility. The handling device and the identification system are typically controlled by means of a control means such as a central processing unit, and a database of the freely walking cows.

Thus, a cow approaching the milking station may be given access to the milking facility after having been identified by the identification system. During milking, milk is drawn from the teats of the cow by means of vacuum being applied to the teatcups. The milk drawn from each teat is individually measured by means of the milk flow-measuring device, whereafter it is collected in the end unit. After the milking has been completed the cow may leave the milking facility.

In order to optimize the efficiency of such milk facility a respective threshold value is assigned to each of the teats, or udder quarters, of the cow to be milked, wherein each of the respective threshold values indicates a threshold value related to the milk flow from the udder quarter to which it is assigned, at which the milking of that udder quarter is to be ended.

The respective threshold values may be instantaneous milk flow values, milk flow values integrated over a short time period (time averaged milk flow), or over the complete milking to give an accumulated milk flow corresponding to the total milk yield of the respective udder quarter.

The use of such threshold values will be described with reference to FIG. 1a, which schematically displays a diagram in which the milking rate in milk quantity drawn per unit time for each udder quarter is set out against time in a typical automatic milking cycle. Such milking cycle includes a separation in time between the beginning of milking each udder quarter. Thus, milking of the first udder quarter ($1^{st}$ u.q.) is commenced at time start1; milking of the second udder quarter ($2^{nd}$ u.q.) is commenced at time start2; milking of the third udder quarter ($3^{rd}$ u.q.) is commenced at time start3; and finally milking of the fourth udder quarter ($4^{th}$ u.q.) is commenced at time start4. The different milking start times for the different udder quarters are due to the fact that a single robot arm is used to apply the respective teatcup to the respective teat (udder quarter) of the cow in a sequential order (here 1, 2, 3, 4) and milking of a teat is commenced when a teatcup is applied thereto. Thus, the period of time between two subsequent milking start times corresponds to the time the robot arm uses for collecting a further teatcup and applying it to a teat, which can be in the order of 30 seconds. Nevertheless, the present invention is very useful also in the case the milking of all teats is commenced simultaneously.

During milking, the individual milk flow from each udder quarter of the cow is measured in-situ and the values measured are thus forming the different milking rate curves of FIG. 1a. As seen, the milk flow increases rather quickly and reaches a maximum after a certain period of time. Subsequently thereto, the milk flow decreases firstly rather rapidly and then more slowly and a characteristic tail of the milk flow curve is obtained. Note that the total milk flow from the cow is obtained by adding the individual flows and that the accumulated milk flow, i.e. the milk yield, is obtained by integrating the respective individual milk flows (where the sum of the integrated milk flows gives the total milk yield from the cow).

In FIG. 1a all the udder quarters are assigned a milk flow threshold value t.v. and milking of the first udder quarter is stopped at time end1, i.e. when the milk flow from the first udder quarter reaches the given threshold value t.v. Correspondingly, milking of the second udder quarter is stopped at time end2, milking of the third udder quarter is stopped at time end3, and finally, milking of the fourth udder quarter is stopped at time end4. This results in a total milking time of tmt, i.e. the time lapsed from the start of the milking of the first udder quarter (start1) to the ending of milking of the last, i.e. the fourth, udder quarter (end4).

By such approach using threshold values for determining the milking time of respective udder quarter the total milking time (i.e. milking time for all four udder quarters) may be reduced to the cost of leaving small amounts of milk in the respective udder quarters. Nevertheless, the time savings provide for a more effective use of the automatic milking facility as the capacity thereof is freed more rapidly, and this capacity can be used for the milking of a further cow (which further cow will have a much higher milk yield during the time period corresponding to the time saved in the previous milking cycle).

It shall be noted that a typical cow has almost twice as much milk in her rear teats as in her front teats, despite not being indicated in FIG. 1a. Thus, teatcups are preferably attached to the rear teats first, and thereafter to the front teats. A typical sequential order would be rear left, rear right, front left and finally front right. As a consequence of the different milk content in different teats it is difficult, if at all possible, to predict in which order the milking of the teats is terminated. FIG. 1a is in this respect illustrating a simple example. In the general case it is not known in advance the order in which the milking of the different udder quarters should be terminated.

Nevertheless, it would be desirable to further reduce the milking time by means of bringing the termination of the milking of the very last remaining udder quarter ($4^{th}$ u.q. of FIG. 1a), and optionally the second last remaining udder quarter ($3^{rd}$ u.q. of FIG. 1a), and yet optionally the third last remaining udder quarter ($2^{nd}$ u.q. of FIG. 1a), forward, i.e. terminating the milking of these udder quarters earlier (indicated by arrows at end3 and end4 for the two last finished udder quarters in FIG. 1a).

Figure 1B:
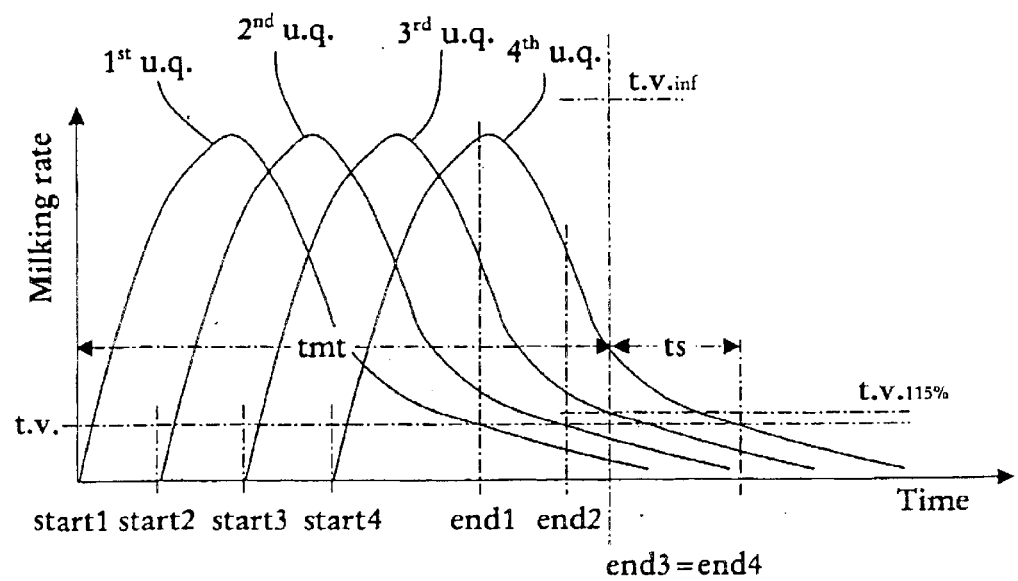
FIG. 1b displays schematically the diagram of FIG. 1a wherein different milking stop times for each udder quarter, in accordance with the present invention, are set out.

Turning now to FIG. 1b, which displays schematically the diagram of FIG. 1a wherein such earlier milking stop mechanisms for the fourth and third udder quarters are indicated. Here, milking of the first and second milked udder quarters is terminated when the respective measured milk flow reaches the respective threshold value t.v.

Immediately when the milking of the udder quarter, for which the milk flow falls below the respective threshold value as second milk flow, is ended ($2^{nd}$ u.q. in FIG. 1b), the threshold values for the udder quarters, which are still being milked, are raised to a constant value $t.v._{.115\%}$, i.e. to 115% of their earlier values. Note that 115% shall only be seen as one example.

Further, when the milk flow from any of the udder quarters, which are still being milked, falls below the new dynamically assigned udder quarter individual threshold values the milking of that udder quarter is terminated ($3^{rd}$ u.q. in FIG. 1b). As a consequence thereof, the threshold value for the udder quarter, which is still being milked ($4^{th}$ u.q. in FIG. 1b), is raised again, this time to infinity or to a very high value $t.v._{.inf}$. Thus, the milk flow falls immediately below this threshold and the milking cycle is ended.

It shall be noted that by a very high threshold value is here meant a threshold value, which is high enough to cause an immediate termination of the milking of the udder quarter, to which the very high threshold value is assigned. To ensure such an event to occur, the very high threshold value $t.v._{.inf}$ should be higher than the maximum milking rate obtained (as is illustrated in FIG. 1b). If the measurement and control mechanisms are fast the last udder quarter is ended at the same time (as illustrated in FIG. 1b), or almost at the same time, as the second last udder quarter.

By the provisions described an even shortened total milking time tmt is obtained. The time saved compared to the FIG. 1a approach in FIG. 1b indicated by ts.

Note that if only the udder quarter, for which the ending of milking very last remains, is to have its threshold value raised, this udder quarter may in general not be identified until the ending of milking of the three first udder quarters. Correspondingly, whereas the three udder quarters, for which the ending of milking last remains, may be identified at the ending of milking of the first udder quarter.

In respect of the present invention raising a threshold value for an udder quarter to a very high value is equivalent to just interrupting the milking of that udder quarter. Thus, instead of raising a milk flow threshold parameter to such high value, the milking of the udder quarter could merely be terminated.

In a preferred version of the invention the milking of the udder quarter, for which the ending of milking very last remains, is terminated simultaneously with, or just after, the third termination of the milking of an udder quarter of the animal. A simultaneous termination may be achieved by terminating the two udder quarters, for which milking last remains, on the condition that the milk flow from anyone of the two udder quarters falls below its respective threshold value.

Alternatively, the milking of the udder quarter, for which the ending of milking very last remains, is terminated at a certain time period, e.g. 15 seconds, after the third termination of the milking of an udder quarter of the animal even if not the threshold value is reached.

Figure 1C:
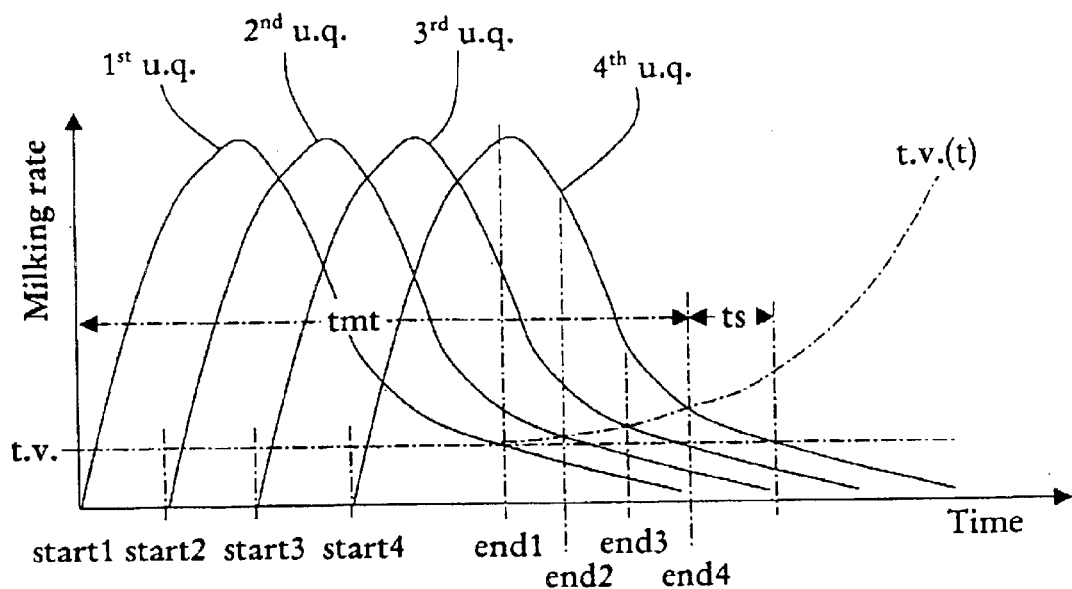
FIG. 1c displays schematically the diagram of FIG. 1a wherein yet different milking stop times for each udder quarter, still in accordance with the present invention, are set out.

With reference now to FIG. 1c, which schematically displays the diagram of FIG. 1a wherein yet a different milking stop mechanism for the second, third and fourth udder quarters is indicated, a further approach will be briefly described.

Immediately when the first milk flow from an udder quarter falls below the threshold value t.v. assigned to it (and when accordingly the milking of this udder quarter $1^{st}$ u.q. is ended), the respective threshold values for the udder quarters still being milked are raised according to a respective time dependent increasing function. In the illustrated case each of threshold values assigned to udder quarters being milked is changed from a constant value t.v. to a time dependent exponentially increasing function t.v.(t). Each threshold value or function may of course in the general case be different. As a consequence of the newly adjusted threshold values the milking of the second, third and fourth udder quarters is finished earlier than in the FIG. 1a approach (indicated in FIG. 1c by end2, end3, and end4). By such provisions a shortened total milking time tmt is obtained and the time saved compared to the FIG. 1a approach is indicated by ts. Certainly only the two last, or the very last, remaining udder quarter(s) could be assigned a time dependent threshold value function. Clearly, in the illustrated case the total milking time would not be increased if for instance the second and third last remaining udder quarters would be milked a slightly longer period of time with the benefit of an increased milk yield. However, in a general case it would be difficult to know in advance the start times, the milk flow and the milk yield of the respective udder quarters and thus such a prolongation of the milking of a particular udder quarter could affect the overall milking time adversely.

The above described concept of a time dependent threshold value can be dynamically modified to incorporate a dependence on the accumulated milk flow from the udder quarter, to which the threshold value is assigned, provided that the accumulated milk flow, i.e. the milk yield, from that udder quarter is calculated or recorded. In such manner it would be possible to adjust the threshold value such that it corresponds to the point where a certain percentage, e.g. 75%, of the milk content of that udder quarter has been milked.

Further, it shall be noted that instead of immediately adjusting the threshold values when the first milk flow falls below the threshold value they may be raised firstly after the expiration of a suitably given period of time.

Figure 1D:
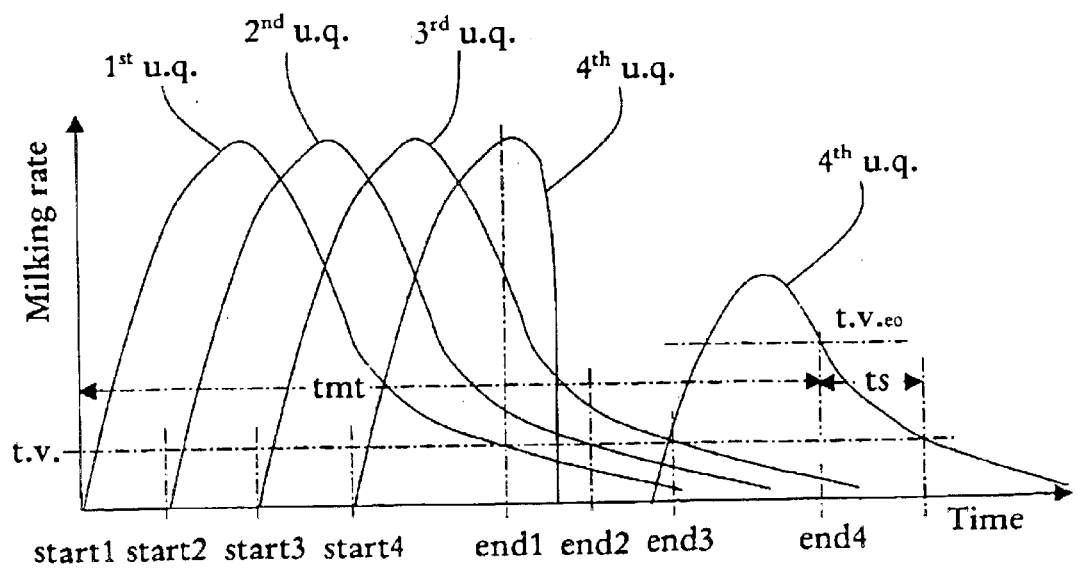
FIG. 1d displays schematically a diagram in which milking rate in quantity per unit time for each udder quarter is set out against time in a milking cycle wherein a teat cup for one of the teats is dropped during milking and subsequently attached to the teat again.

Next, with reference to FIG. 1d, which schematically displays the diagram of FIG. 1a wherein yet a different milking stop mechanism for the fourth udder quarter is indicated, yet a further inventive approach will briefly be described.

Sometimes, the milking of an udder quarter may cease due to an extraordinary event, such as the dropping of a teat cup or a vacuum fall. In FIG. 1d is illustrated an event where the teatcup for the fourth teat is dropped during milking and subsequently attached to the teat again.

In order to handle such a case, a detector is provided for detecting if the milking of an udder quarter is interrupted and in such instance the threshold is typically altered to a negative value such that this udder quarter will not be counted as a ready-milked udder quarter. As, however, such extraordinary event will delay the milking of this udder quarter considerably, the threshold may be set to a considerably high value $t.v._{eo}$ to speed up the milking, see FIG. 1d. As before, the shortened total milking time is denoted by tmt and the time saved compared to the FIG. 1a approach is denoted by ts.

The inventive concept is preferably implemented in the automatic milking facility described above. For that purpose the control means thereof is provided with a storing means for holding the respective threshold values, an initiating/finishing means for controlling the starting and stopping, respectively, of the milking of the respective udder quarters, and a threshold value adjusting means for altering (raising) the respective threshold values.

This is preferably implemented by means of a computer program product loadable into the memory of a computer of the automatic milking facility, the program product comprising software code portions for controlling the milking performed by the automatic milking facility in accordance with the above described approaches when said product is run on said computer.

By means of the present invention the overall milking time of a cow is considerably shortened to the cost of a slightly decreased milk yield from that cow. However, milking capacity of the automatic milking is more rapidly freed, which can be used for the milking of a further cow to thereby increase the milk production by the milking facility.

It shall be appreciated that the milk left in the udder of the cows is not allowed to be so extensive that it can be risky or unhealthy for the cow. To this end no investigations have reached the conclusion that shortened milk times can be unhealthy to the cows.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. A method of automatically milking animals in an automatic milking facility provided with a milk flow measuring device capable of, during milking, in-situ measuring the milk flow from each udder quarter individually of a plurality of udder quarters of the animal being milked, comprising the steps of:
    assigning a respective threshold value to each udder quarter of the plurality of udder quarters of the animal to be milked, each of the respective threshold values indicating a threshold value related to the milk flow from the udder quarter to which the threshold value is assigned, at which the milking of that udder quarter is to be ended;
    beginning the milking of each of the udder quarters of said animal;
    in-situ measuring the individual milk flow from each udder quarter of said animal during milking; and
    ending the milking of the respective udder quarter of said animal depending on the measured milk flow from the respective udder quarter reaching the threshold value assigned to that udder quarter;
    wherein, at least the threshold value for a last milking udder quarter of the plurality of udder quarters of said animal, is raised subsequently to the ending of milking of a first milking udder quarter of said animal, the last milking udder quarter being the udder quarter of the plurality of udder quarters to which milking ends last, the first milking udder quarter being the udder quarter of the plurality of udder uuarters to which milking ends first, to thereby shorten a total milking time of the animal, and thus more rapidly freeing milking capacity of the milking facility to be used for the milking of a further animal.

2. The method of claim 1, wherein the threshold value for the last milking udder quarter of said animal is raised to a constant value immediately after the ending of milking of any of the other udder quarters of said animal.

3. The method of claim 1, wherein the threshold value for the last milking udder quarter of said animal is raised to a very high value immediately after the second to last ending of milking of an udder quarter of said animal to thereby end the milking of the last milking udder quarter without delay.

4. The method of claim 1, wherein the threshold value for the last milking udder quarter of said animal is raised according to a time dependent increasing function, immediately after the ending of milking of any of the other udder quarters of said animal.

5. The method of claim 4, wherein said time dependent increasing function is continuously increasing.

6. The method of claim 4, wherein
    an accumulated milk flow from the last milking udder quarter of said animal is recorded; and
    the threshold value, which is raised according to time dependent increasing function, is dynamically adjusted to end the milking of the last milking udder quarter of said animal depending on said accumulated milk flow.

7. The method of claim 1, wherein the threshold value for the last milking udder quarter of said animal is raised firstly after an expiration of a period of time, said period of time being started immediately after the ending of milking of any of the other udder quarters of said animal.

8. The method of claim 4, wherein the threshold value, which is raised firstly after the expiration of a period of time, is then raised to a very high value to thereby end the milking of the last milking udder quarter of said animal without delay.

9. The method of claim 1, further comprising the steps of:
    detecting if the milking of the last milking udder quarter of said animal is ceasing due to any extraordinary event; and
    adjusting the threshold value for the last milking udder quarter depending on said step of detecting.

10. The method of claim 1, wherein the threshold value for the udder quarter of said animal, for which the ending of milking second to last remains, is raised subsequently to the very first ending of milking of an udder quarter of said animal.

11. An automatic milking facility for automatically milking animals, said facility being provided with a milk flow measuring device for, during milking, in-situ measuring the milk flow from each udder quarter individually of a plurality of udder quarters of the animal being milked, comprising a control device for controlling the progress of milking, said control device including:
    a storing means for holding a respective threshold value assigned to each udder quarter of the plurality of udder quarters of the animal to be milked, each of the respective threshold values indicating a threshold value related to the milk flow from the udder quarter to which the threshold value is assigned, at which the milking of that udder quarter is to be ended;
    an initiating/finishing means for initiating milking of each of the udder quarters of said animal; and ending the milking of the respective udder quarter of said animal depending on the measured milk flow from the respective udder quarter reaches the threshold value assigned to that udder quarter; and a threshold value adjusting means for raising at least the threshold value for a last milking udder quarter of said animal subsequently to the ending of milking of a first milking udder quarter of said animal, the last milking udder quarter being the udder quarter of the plurality of udder quarters to which milking ends last, the first milking udder quarter being the udder quarter of the plurality of udder quarters to which milking ends first, to thereby shorten a total milking time of the animal, and thus more rapidly freeing milking capacity of the milking facility to be used for the milking of a further animal.

12. The automatic milking facility of claim 11, wherein said threshold value adjusting means is adapted to raise the threshold value for the last milking udder quarter of said animal to a constant value immediately after the ending of milking of any of the other udder quarters of said animal.

13. The automatic milking facility of claim 11, wherein said threshold value adjusting means is adapted to raise the threshold value for the last milking udder quarter of said animal to a very high value immediately after the second to last ending of milking of an of udder quarters of said animal to thereby end the milking of the last milking udder quarter without delay.

14. The automatic milking facility of claim 11, wherein said threshold value adjusting means is adapted to raise the threshold value for the last milking udder quarter of said animal according to a time dependent increasing function, immediately after the ending of milking of any of the other udder quarters of said animal.

15. The automatic milking facility of claim 11, wherein said threshold value adjusting means is adapted to raise the threshold value for the last milking udder quarter of said animal firstly after an expiration of a period of time, said period of time being started immediately after the ending of milking of any of the other udder quarters of said animal.

16. The automatic milking facility of claim 11, further comprising a detector for detecting if the milking of the last milking udder quarter of said animal is ceasing due to any extraordinary event; and wherein said threshold value adjusting means is adapted to adjust the threshold value for the last milking udder quarter depending on said detection.

17. The automatic milking facility of claim 11, wherein said threshold value adjusting means is adapted to raise the threshold value for the udder quarter of said animal, for which the ending of milking second last remains, subsequently to the very first ending of milking of an udder quarter of said animal.

18. A computer program product loadable into the internal memory of a computer of a computer-controlled milking facility, comprising software code portions for controlling the milking performed by the computer-controlled milking facility in accordance with the method of claim 1 when said product is run on said computer.

19. A method of automatically milking animals in an automatic milking facility provided with a milk flow measuring device capable of, during milking, in-situ measuring the milk flow from each udder quarter individually of the animal being milked, comprising the steps of:

assigning a respective threshold value to each of the udder quarters of an animal to be milked, each of the respective threshold values indicating a threshold value related to the milk flow from the udder quarter to which it is assigned, at which the milking of that udder quarter is to be ended;

beginning the milking of each of the udder quarters of said animal;

in-situ measuring the individual milk flow from each udder quarter of said animal during milking; and ending the milking of the respective udder quarter of said animal depending on the measured milk flow from the respective udder quarter reaches the threshold value assigned to that udder quarter; wherein the threshold value for anyone of the udder quarters of said animal, for which the ending of milking remains after the first ending of milking of an udder quarter of said animal, is raised to thereby shorten the total milking time of the animal, and thus more rapidly freeing milking capacity of the milking facility to be used for the milking of a further animal.

20. A method of automatically milking animals in an automatic milking facility provided with a milk flow measuring device capable of, during milking, in-situ measuring the individual milk flow from each udder quarter of the animal being milked, comprising the steps of:

assigning a respective threshold value to each of the udder quarters of an animal to be milked, each of the respective threshold values indicating a threshold value related to the milk flow from the udder quarter to which it is assigned, at which the milking of that udder quarter is to be ended;

beginning the milking of each of the udder quarters of said animal;

in-situ measuring the individual milk flow from each udder quarter of said animal during milking;

ending the milking of the udder quarter of said animal for which the measured milk flow first reaches the threshold value; and subsequent to the first ending of milking of an udder quarter of said animal, terminating milking of anyone of the other udder quarters of said animal, for which the ending of milking remains, before the milk flow therefrom reaches its threshold value, to thereby shorten the total milking time of the animal, and thus more rapidly freeing milking capacity of the milking facility to be used for the milking of a further animal.

21. The method of claim 20, wherein said anyone of the udder quarters of said animal is the udder quarter for which the ending of milking very last remains.

22. The method of claim 2, wherein the threshold value for the last milking udder quarter of said animal is raised to 115% or 300% of an earlier value of the threshold value immediately after the ending of milking of any of the other udder quarters of said animal.

23. The method of claim 9, wherein said any extraordinary event is a dropping of a teat cup or a vacuum fall.

24. The automatic milking facility of claim 12, wherein said threshold value adjusting means is adapted to raise the threshold value for the last milking udder quarter of said animal to 115% or 300% of its earlier value, immediately after the ending of milking of any of the other udder quarters of said animal.

25. The automatic milking facility of claim 16, wherein said any extraordinary event is a dropping of a teat cup or a vacuum fall.

* * * * *